(12) United States Patent
Haskin et al.

(10) Patent No.: US 9,779,731 B1
(45) Date of Patent: Oct. 3, 2017

(54) ECHO CANCELLATION BASED ON SHARED REFERENCE SIGNALS

(75) Inventors: Menashe Haskin, Palo Alto, CA (US); Kavitha Velusamy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 687 days.

(21) Appl. No.: 13/589,967

(22) Filed: Aug. 20, 2012

(51) Int. Cl.
G10L 15/00 (2013.01)
G10L 15/06 (2013.01)
G10L 15/20 (2006.01)
G10L 21/00 (2013.01)
G10L 21/02 (2013.01)

(52) U.S. Cl.
CPC .................................. G10L 15/20 (2013.01)

(58) Field of Classification Search
None
See application file for complete search history.

(56) References Cited

U.S. PATENT DOCUMENTS

| | | | | |
|---|---|---|---|---|
| 4,479,207 A | * | 10/1984 | Hartman | G01S 15/10 367/107 |
| 5,485,844 A | * | 1/1996 | Uchibori | G01S 15/8979 600/455 |
| 5,974,379 A | * | 10/1999 | Hatanaka et al. | 704/225 |
| 6,404,761 B1 | * | 6/2002 | Snelling | H04M 1/723 370/338 |
| 7,418,392 B1 | | 8/2008 | Mozer et al. | |
| 7,720,683 B1 | | 5/2010 | Vermeulen et al. | |
| 7,774,204 B2 | | 8/2010 | Mozer et al. | |
| 2003/0053617 A1 | * | 3/2003 | Diethorn | H04M 9/082 379/406.01 |
| 2004/0138882 A1 | * | 7/2004 | Miyazawa | G10L 15/065 704/233 |
| 2005/0143974 A1 | * | 6/2005 | Joly | G10L 25/69 704/201 |
| 2006/0122832 A1 | * | 6/2006 | Takiguchi | G10L 21/0208 704/240 |
| 2007/0061134 A1 | * | 3/2007 | Wong | 704/216 |
| 2007/0071230 A1 | * | 3/2007 | Schulz | H04M 9/082 379/406.06 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Richemond Dorvil
*Assistant Examiner* — Thuykhanh Le
(74) *Attorney, Agent, or Firm* — Lee & Hayes, PLLC

(57) ABSTRACT

An audio processing system configured to generate, based at least in part on captured sound, an audio signal that includes a speech component corresponding to a user's speech utterance and an audio component corresponding to audio output of another device is described herein. The audio processing system is also configured to receive a reference signal that corresponds to the audio output of the other device. The reference signal may be received as ultrasonic audio output of the other device or from a remote server. The audio processing device then processes the generated audio signal to remove at least a part of the generated audio signal that corresponds to the reference signal.

26 Claims, 5 Drawing Sheets

(56) References Cited

U.S. PATENT DOCUMENTS

| | | | |
|---|---|---|---|
| 2007/0084286 A1* | 4/2007 | Ajay | G01F 1/667 73/597 |
| 2007/0263851 A1* | 11/2007 | Sukkar | H04B 3/23 379/406.01 |
| 2008/0247535 A1* | 10/2008 | Li | H04M 9/082 379/406.08 |
| 2009/0037172 A1* | 2/2009 | Fodrini | G10L 15/30 704/243 |
| 2009/0145232 A1* | 6/2009 | Suginouchi | G01S 7/536 73/597 |
| 2009/0248411 A1* | 10/2009 | Konchitsky | G10L 15/20 704/242 |
| 2010/0049452 A1* | 2/2010 | Suginouchi | G01S 15/42 702/56 |
| 2010/0169089 A1* | 7/2010 | Iwasawa | G10L 21/028 704/233 |
| 2010/0250244 A1* | 9/2010 | Zhong | G10L 19/008 704/203 |
| 2011/0099010 A1* | 4/2011 | Zhang | G10L 21/0272 704/233 |
| 2012/0008752 A1* | 1/2012 | Wong | 379/88.07 |
| 2012/0016678 A1* | 1/2012 | Gruber | G06F 17/3087 704/275 |
| 2012/0136660 A1* | 5/2012 | Harman | G10L 15/24 704/254 |
| 2012/0138676 A1* | 6/2012 | Ma | B65H 7/12 235/379 |
| 2012/0223885 A1 | 9/2012 | Perez | |
| 2012/0282976 A1* | 11/2012 | Suhami | G10K 11/1786 455/556.1 |
| 2012/0284023 A1* | 11/2012 | Vitte | H04M 9/082 704/233 |
| 2012/0310640 A1* | 12/2012 | Kwatra | G10K 11/1784 704/233 |
| 2012/0314883 A1* | 12/2012 | Kang | H04B 13/005 381/71.8 |
| 2013/0163795 A1* | 6/2013 | Takeda | H04R 1/26 381/303 |
| 2013/0191119 A1* | 7/2013 | Sugiyama | H04B 3/23 704/226 |
| 2014/0003635 A1* | 1/2014 | Mohammad | G10K 11/16 381/306 |

* cited by examiner

ECHO CANCELLATION BASED ON SHARED REFERENCE SIGNALS

BACKGROUND

Homes are becoming more wired and connected with the proliferation of computing devices such as desktops, tablets, entertainment systems and portable communication devices. As these computing devices evolve, many different ways have been introduced to allow users to interact with them, such as through mechanical devices (e.g., keyboards, mice, etc.), touch screens, motion detectors and gesture recognition systems. Another way to interact with computing devices is through speech.

One drawback with speech recognition is that vocal interaction with a computing device can be affected by noises present in the room, the volume of the individual speaking, the location of the individual relative to the device, and the orientation of the individual relative to the device. While there are advanced techniques available to extract speech from the audio signal, doing so in near real-time is computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
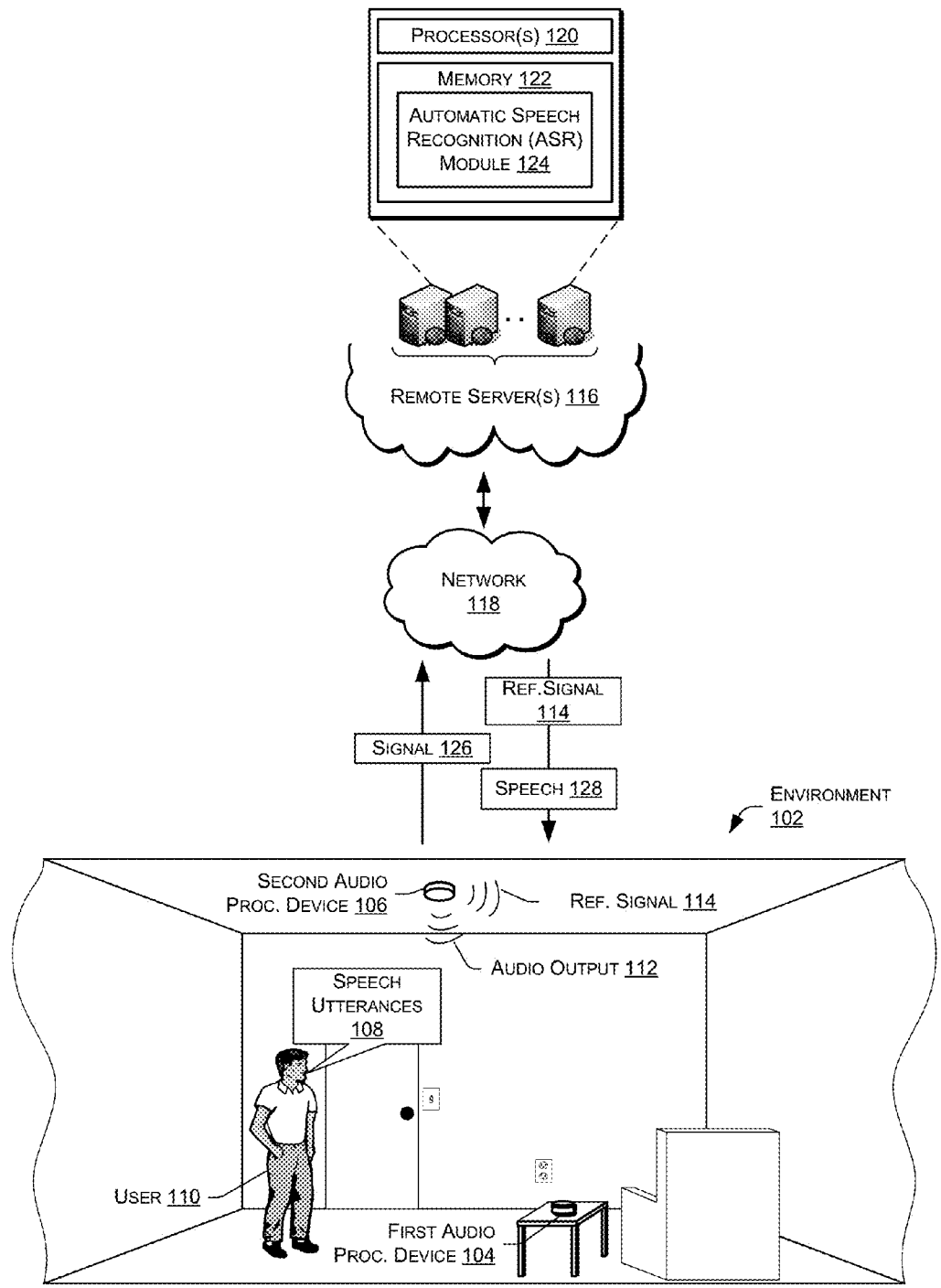
FIG. 1 depicts an example voice interaction computing architecture set in an example environment.

This disclosure describes, in part, an environment that includes multiple audio processing devices, each audio processing device configured to output audio and to capture a user's speech utterance, background noise from the environment, and audio output from the other audio processing devices. For purposes of discussion, the disclosure will refer to a first audio processing device and a second audio processing device, but it is to be understood that these are representative audio processing devices and that the environment may include any number of audio processing devices. In some embodiments, the first audio processing device receives a reference signal that corresponds to the audio output from the second audio processing device and utilizes that reference signal in processing an audio signal generated based at least in part on captured sound. The reference signal is played as the audio output of the second audio processing device.

The first audio processing device may receive the reference signal substantially concurrently with capturing sound that includes at least a user's speech utterance and audio output of the second audio processing device, or may receive the reference signal before such capturing such sound. For example, the first audio processing device may process the audio signal by removing at least a part of the audio signal that corresponds to the received reference signal. By removing this part of the audio signal that corresponds to the reference signal, the first audio processing device is able to substantially remove the audio component corresponding to the audio output of the second audio processing device from the audio signal. The first audio processing device also removes background noise and distortions to the audio signal and performs speech recognition on the remaining part(s) of the audio signal, which may substantially comprise the speech component corresponding to a user's speech utterance.

In various embodiments, the second audio processing device may share a reference signal that corresponds to its audio output with the first audio processing device by outputting the reference signal as ultrasonic audio output. In some embodiments, the reference signal is encoded with an error correction encoding scheme before being output and is thus an encoded reference signal when played as ultrasonic audio output. For example, the second audio processing device may utilize error correction codes when encoding the reference signal. In other embodiments, the second audio processing device may transmit the encoded reference signal via wireless data transmission (e.g., Wi-Fi, Wi-Max, Bluetooth, etc.) rather than playing the encoded reference signal as ultrasonic audio output.

The first audio processing device, upon receiving the reference signal as ultrasonic audio output or as a wireless data transmission, may first use the same error correction encoding scheme that was used to encode the reference signal to decode the received reference signal. Use of error correction may help remove any distortion effects caused by a speaker of the second audio processing device, by the environment that includes the first and second audio processing devices, or by the microphone of the first audio processing device. The first audio processing device may then use the decoded reference signal and an echo cancellation filter to remove a part of the audio signal that corresponds to the reference signal, and thereby substantially remove the audio component that corresponds to the audio output of the second audio processing device from the audio signal.

In various embodiments, rather than receiving the reference signal from the second audio processing device, the first audio processing device may receive the reference signal from a remote server. The remote server may provide the reference signal to the second audio processing device for the second audio processing device to play the reference signal as the audio output of the second audio processing device. The remote server may also provide the reference signal to the first audio processing device to enable the first audio processing device to recognize the audio output of the second audio processing device among a number of sounds captured by a microphone of the first audio processing device. The first audio processing device may then use the reference signal and an echo cancellation filter to remove a part of the audio signal corresponding to the reference signal, as mentioned above.

In some embodiments, as an alternative to using an echo cancellation filter, the first and second audio processing devices may participate in a calibration stage. In this stage, the second audio processing device may output a calibration sound prior to playing the audio output. The calibration sound may also be associated with a reference signal. The first audio processing device may then capture the calibration sound, generate a calibration audio signal based on the calibration sound, and utilize the reference signal for the calibration sound to determine one or more distortions, the distortions representing differences between the calibration audio signal and the reference signal for that calibration sound. The first audio processing device may obtain that reference signal through ultrasonic transmission, wireless data transmission, or from a remote server. The first audio processing device may then utilize the determined distortions and reference signal for the audio output of the second audio processing device to substantially remove the audio component corresponding to audio output from the generated audio signal.

In further embodiments, rather than receiving a reference signal, the first audio processing device may receive an indication of a reference signal, such as an identifier, a timestamp, or reference signal metadata, and may utilize that indication to retrieve the reference signal. The indication may also be transmitted as ultrasonic audio output, as a wireless data transmission, or may be received from a remote server.

Example Environment

FIG. 1 depicts an example voice interaction computing architecture set in an example environment 102. The architecture includes a first audio processing device 104 and a second audio processing device 106 physically situated in the environment 102. In the illustrated implementation, the first audio processing device 104 is positioned on a table, while the second audio processing device 106 is mounted to the ceiling in the environment 102. In other implementations, any other number of audio processing devices may be placed in any number of locations (e.g., on walls, in a lamp, beneath a table, under a chair, etc.). As such, implementations described herein may utilize more or fewer audio processing devices than the two described with respect to this FIG. 1.

In some instances, the first audio processing device 104 has a microphone and speaker to capture speech utterances 108 of a user 110 and to facilitate audio interactions with the user 110. The audio processing devices 104 and 106 may be implemented with or without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, in some instances the primary and potentially only mode of user interaction with the audio processing devices 104 and 106 is through speech utterances 108 and audio output of the first audio processing device 104. One example implementation of a first audio processing device 104 or second audio processing device 106 is provided below in more detail with reference to FIG. 2.

In further implementations, the first audio processing device 104 may also capture audio output 112 played by a speaker of the second audio processing device 106. The audio output 112 represents played audio for a reference signal 114 stored by the second audio processing device 106. For example, the reference signal 114 may be a file for a song, and the audio output 112 may represent the sound of that song when played by the second audio processing device 106. When that audio output 112 is captured by the first audio processing device 104 and a corresponding audio component is included in the audio signal, it will include distortions from signal processing by either or both of the first audio processing device 104 or the second audio processing device 106, distortions from the speaker of the second audio processing device 106, distortions from the microphone of the first audio processing device 104, or distortions from the environment 102. The audio component corresponding to the audio output 112 captured by the first audio processing device 104 is substantially similar, then, to a combination of the reference signal 114 and the above-mentioned distortions. This audio component may be included as part of a single audio signal that includes the audio component corresponding to the audio output 112, the speech component corresponding to the speech utterances 108, and any background noise in the environment 102.

To substantially remove the background noise and the audio component corresponding to the audio output 112 from the audio signal, the first audio processing device 104 may utilize one or more of a received copy of the reference signal 114, an echo cancellation filter, or a calibration stage. The first audio processing device 104 may receive the reference signal 114 before the audio output 112 or substantially concurrently with receiving the audio output 112, and may receive the reference signal 114 in any of a number of ways. For instance, the first audio processing device 104 may receive the reference signal 114 as ultrasonic audio output of the second audio processing device 106 or as a wireless data transmission of the second audio processing device 106. Alternatively, the first audio processing device 104 may receive the reference signal 114 from remote server(s) 116 connected to the first audio processing device 104 by a network 118. The remote server(s) 116 may provide the reference signal 114 to both the first audio processing device 104 and the second audio processing device 106. In further embodiments, rather than receiving the reference signal 114, the first audio processing device 104 may receive an indication of the reference signal, such as an identifier, timestamp, or metadata associated with the reference signal 114, and may utilize the indication to retrieve the reference signal 114 from the remote server(s) 116.

Prior to utilizing the reference signal 114, the first audio processing device 104 may determine if the reference signal 114 is digitally encoded with an error correction encoding scheme. Such an error correction encoding scheme may provide a mechanism for transmitting a signal which is then subject to distortions and for decoding such a distorted, encoded signal to retrieve an original signal. Mechanisms for providing such encoding may include redundant representations of bits of a signal or extra bits at the end of a signal. The first audio processing device 104 may then utilize the same error correction encoding scheme to decode the received reference signal 114 and recover a reference signal 114 that is free of distortions.

The first audio processing device 104 may then utilize the reference signal 114 and an echo cancellation filter to substantially remove the audio component corresponding to the audio output 112 from the audio signal. The filter may be used by the first audio processing device 104 to remove background noise and the above-mentioned distortions to the audio output 112. After filtering, the audio signal may substantially include the speech component correspond to the speech utterances 108 and the reference signal 114. The first audio processing device 104 may then subtract the reference signal 114 from the audio signal, leaving a captured audio stream that substantially comprises speech component correspond to the speech utterances 108.

In some embodiments, before capturing the sound and generating the audio signal, the first audio processing device 104 may capture a calibration sound that includes calibration audio output from the second audio processing device 106 that represents a calibration reference signal stored on the second audio processing device 106. Based on the captured calibration sound, the first audio processing device 104 may generate a calibration audio signal. This calibration stage may occur when a user 110 is not speaking. The second audio processing device 106 or remote server(s) 116 may transmit the calibration reference signal to the first audio processing device 104 in any of the manners described above and the first audio processing device 104 may compare the calibration audio signal to the received calibration reference signal to determine one or more distortions that are applied by either of the audio processing devices 104 and 106 or by the environment 102. These distortions may then be used, along with reference signal 114, to substantially remove the audio component corresponding to the audio output 112 from the audio signal.

In some instances, the first audio processing device 104 includes functionality for performing automatic speech recognition (ASR) on the speech component corresponding to the speech utterances 108 remaining in the processed audio signal to ascertain what the user 110 has spoken. After ascertaining what the user 110 has spoken, the first audio processing device 104 may provide a response to the user 110. For instance, when the user 110 asks "What is the temperature outside?" the first audio processing device 104 may identify the query, determine a response to the query and output the response. In the foregoing example, the first audio processing device 104 may perform a search over a network 118 to determine a current temperature at the location of the user 110 and may output this temperature via one or more speakers in the environment 102 (e.g., "It is currently 72 degrees Fahrenheit outside").

The first audio processing device 104 and/or second audio processing device 106 may communicatively couple to the remote server(s) 116 via the network 118, which may represent wired technologies (e.g., wires, USB, fiber optic cable, etc.), wireless technologies (e.g., RF, cellular, satellite, Bluetooth, etc.) and/or other connection technologies. The network 118 carries data, such as audio data, between one or more of the audio processing devices 104 and 106 and the remote server(s) 116.

In some embodiments, rather than performing ASR on the first audio processing device 104, the first audio processing device 104 may utilize the remote server(s) 116 to perform ASR. After processing the audio signal, the first audio processing device 104 may send this processed audio signal as signal 126 to the remote server(s) 116 over the network 118. As illustrated, the remote server(s) 116 may include one or more servers. These server(s) 116 may be arranged in any number of ways, such as server farms, stacks and the like that are commonly used in data centers. Furthermore, the server(s) 116 may include one or more processors 120 and memory 122, which may store a speech recognition module 124.

In some instances, the speech recognition module 124 may then utilize the signal 126 to perform the ASR. After doing so, the speech recognition module 124 may formulate a response comprising a representation of the speech 128 produced by the ASR (e.g., a string of characters, etc.) and provide that response to the first audio processing device 104 over the network 118. When received, the first audio processing device 104 may utilize the representation for further processing. For example, in the above example in which the user asked about the weather, the first audio processing device 104 may utilize the representation of the speech 128 as a query and may output an answer to the query as audio output of the first audio processing device 104. In other instances, the remote servers 116 may provide a response for output back to the first audio processing device 104 rather than the identified speech 128. In these instances, the remote servers 116 may identify the response to the query and provide the answer for output by the device 104 (e.g., "It is currently 72 degrees Fahrenheit outside").

Example Device

Figure 2:
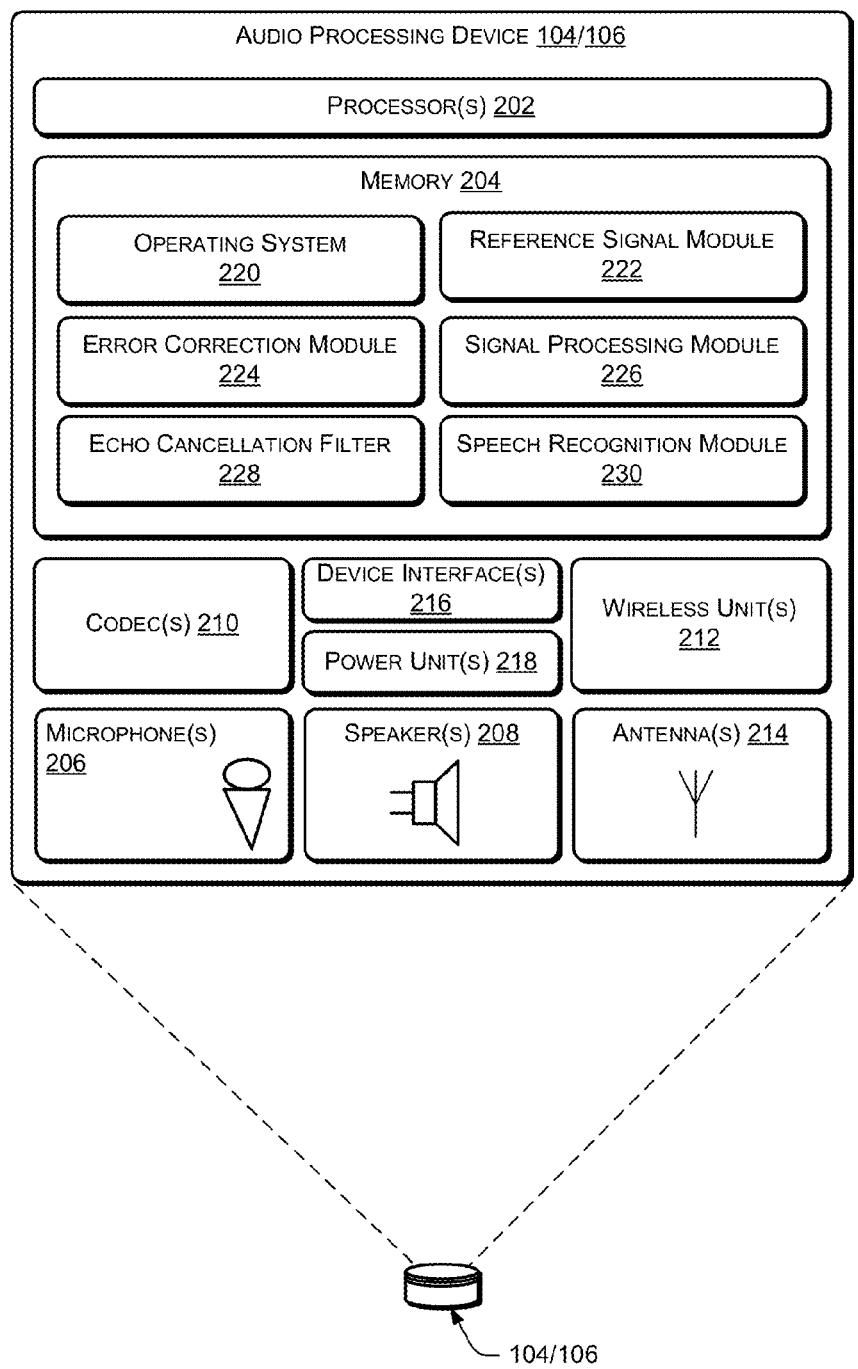
FIG. 2 depicts a block diagram of selected functional components implemented in an example audio processing device of FIG. 1, including modules for acquiring and utilizing a shared reference signal.

FIG. 2 shows selected functional components of the first audio processing device 104/second audio processing device 106 in more detail. Reference will be made in the remainder of the description of FIG. 2 to the first audio processing device 104, but it is to be understood that the components of the first audio processing device 104 described herein may also represent the components of the second audio processing device 106. Generally, the first audio processing device 104 may be implemented as a standalone device that includes limited input/output components, memory and processing capabilities. For instance, the first audio processing device 104 might not include a keyboard, keypad or other form of mechanical input. The first audio processing device 104 might also not include a display or touch screen to facilitate visual presentation and user touch input. Instead, the first audio processing device 104 may be implemented with the ability to receive and output audio, a network interface (wireless or wire-based), power and limited processing/memory capabilities. In other implementations, however, the first audio processing device 104 may have input/output components or a display.

In the illustrated implementation, the first audio processing device 104 includes one or more processors 202 and memory 204. The memory 204 (and each memory described herein) may include tangible computer-readable media ("TCRM"), which may be any available physical media accessible by the processors 202 to execute instructions stored on the memory. In one basic implementation, TCRM may include random access memory ("RAM") and Flash memory. In other implementations, TCRM may include, but is not limited to, read-only memory ("ROM"), electrically erasable programmable read-only memory ("EEPROM") or any other medium which can be used to store the desired information and which can be accessed by the processors 202.

The first audio processing device 104 also includes one or more microphones 206 for capturing audio within an environment, such as the example environment 102. In some implementations, the microphones 206 may take the form of a microphone array that includes multiple microphones. The first audio processing device 104 may also include one or more speakers 208 to output audio sounds, including both human-audible sounds and ultrasonic audio output. A codec 210 may couple to the microphones 206 and speaker 208 to encode and/or decode the audio signals. The codec 210 may convert audio data between analog and digital formats. A user 110 may interact with the first audio processing device 104 by speaking to it, and the microphone 206 captures the user's speech utterances 108 as a speech component. The codec 210 encodes the captured speech component and transfers that audio data to other components. The first audio processing device 104 can communicate back to the user 110 by emitting audible statements through the speaker 208. In this manner, the user 110 interacts with the first audio processing device 104 simply through speech utterances, without use of a keyboard or display common to other types of devices.

The first audio processing device 104 may also include a wireless unit 212 coupled to an antenna 214 to facilitate a wireless connection to a network. The wireless unit 212 may implement one or more of various wireless technologies, such as Wi-Fi, Wi-Max, Bluetooth, Radio Frequency, Near Field Communication and other wireless technologies.

A device interface 216 (e.g., a USB port, broadband interface, etc.) may further be provided as part of the first audio processing device 104 to facilitate a wired connection to a network, or a plug-in network device that communicates with other wireless networks. A power unit 218 is further provided to distribute power to the various components on the first audio processing device 104.

In some implementations, the first audio processing device 104 may include non-input control mechanisms, such as basic volume control button(s) for increasing/decreasing volume, as well as power and reset buttons. For example, there may also be a simple light element (e.g., LED) to indicate a state such as when power is on and/or when data is being sent or received. The device 104 may also include one or more LEDs arranged along a top portion of the housing, which may illuminate in response to receiving user speech utterances, in response to outputting audio, to identify a state of the device, or the like.

Further, the first audio processing device 104 may be implemented as an aesthetically appealing device with smooth and rounded surfaces, with some apertures for passage of sound waves, a power cord or internal charge (e.g., battery) and communication interface (e.g., broadband, USB, Wi-Fi, etc.). Once plugged in, or otherwise powered, the device may automatically self-configure, or with slight aid of the user, and be ready to use. As a result, the first audio processing device 104 may be generally produced at a relatively low cost. In other implementations, other I/O components may be added, such as specialty buttons, a keypad, display and the like.

The memory 204 may store an array of different datastores and/or modules, including an operating system module 220 that is configured to manage hardware and services (e.g., microphones, wireless unit, USB, codec) within and coupled to the first audio processing device 104 for the benefit of other modules.

The memory 204 may further store a reference signal module 222. When operating as the second audio processing device 106 depicted in FIG. 1, the reference signal module 222 of the audio processing device 104/106 may be invoked by the operating system 220, by an application of the audio processing device 104/106, or by the signal processing module 226 to encode a reference signal 114 and provide that encoded reference signal 114 for ultrasonic or wireless data transmission. The audio processing device 104/106 may be playing that reference signal 114 as audio output 112 and may specify the reference signal 114 to the reference signal module 222. If the reference signal 114 is to be played as ultrasonic audio output, the reference signal module 222 may invoke the error correction module 224 to digitally encode the reference signal 114 with an error correction encoding scheme. If the reference signal 114 is to be transmitted as a wireless data transmission (e.g., as a Wi-Fi or Bluetooth transmission), the reference signal module 222 may invoke the error correction module 224 or some other module to apply an encoding scheme. Upon receiving the encoded reference signal 114 from the error correction module 224 or other module, the reference signal module 222 may provide the encoded reference signal 114 to the operating system 220 for transmission as ultrasonic audio output over the speaker 208 or as a wireless data transmission over the wireless unit 212 and antenna 214. The operating system 220 may then cause the encoded reference signal 114 to be transmitted substantially concurrently with the playing of the audio output 112 or prior to the playing of the audio output 112.

When operating as the first audio processing device 104 depicted in FIG. 1, the reference signal module 222 of the audio processing device 104/106 may receive a reference signal 114 from the operating system 220, from an application of the audio processing device 104/106, or from the signal processing module 226. Those components may in turn have captured the reference signal 114 as ultrasonic audio output included in an audio signal, as a wireless data transmission from a second audio processing device 106, or as a transmission from remote server(s) 116. Upon receiving the reference signal 114, the reference signal module 222 may determine if the reference signal 114 is encoded. If encoded, the reference signal module 222 may invoke the error correction module 224 or another module to decode the encoded reference signal 114. Such decoding may remove distortions from the reference signal 114 that were acquired as a result of ultrasonic or wireless transmission. The received, decoded reference signal 114 may be substantially the same reference signal 114 possessed by the second audio processing device 106 that is played by the second audio processing device 106 as audio output 112. In some embodiments, the received reference signal 114 may comprise only an indication of the reference signal 114, such as an identifier of the reference signal 114, a timestamp, or reference signal metadata. In such embodiments, the reference signal module 222 may utilize the indication to retrieve the reference signal 114 from remote server(s) 116. Upon receiving or retrieving a decoded reference signal 114, the reference signal module 222 may invoke the signal processing module 226 and provide the signal processing module 226 with the decoded reference signal 114.

In various embodiments, operating as the second audio processing device 106 depicted in FIG. 1, the error correction module 224 of the audio processing device 104/106 may apply an error correction encoding scheme to the reference signal 114. Before applying the scheme, the error correction module 224 may invoke the codec 210 to transform the reference signal 114 into a digitally encoded reference signal 113. The scheme applied to the digitally encoded reference signal 114 may be any scheme known in the art, such as the use of error correction codes. Other schemes, such as using duplicated bits throughout the digitally encoded reference signal 114, may also be used. Upon encoding the reference signal 114, the error correction module 224 may provide the encoded reference signal 114 to the reference signal module 222 for further processing.

When operating as the first audio processing device 104 depicted in FIG. 1, the error correction module 224 of the audio processing device 104/106 may receive a digitally encoded reference signal 114 from the reference signal module 222. Upon receiving the digitally encoded reference signal 114, the error correction module 224 may apply an error correction encoding scheme to decode the digitally encoded reference signal 114. The error correction encoding scheme used to decode may be the same scheme used to encode and may enable the error correction module 224 to retrieve a decoded, digital copy of the reference signal 114 that is free from any distortion acquired in transmission. The error correction module 224 may then invoke the codec 210 to retrieve an analog copy of the reference signal 114. This analog copy may be substantially the same as the reference signal 114 stored on the second audio processing device 106. The error correction module 224 may then provide the analog copy of the reference signal 114 to the reference signal module 222.

In various embodiments, when operating as the first audio processing device 104 depicted in FIG. 1, the signal processing module 226 of the audio processing device 104/106 may receive a generated audio signal from the operating system 220, the operating system 220 having in turn generated the audio signal based on captured sound received from drivers or controller associated with the microphone 206. The signal processing module 226 may then process the audio signal by separating the audio signal into one or more parts associated with human-audio sound and other parts associated with ultrasonic audio. Such separation may be based on the frequency of the audio. The signal processing module 226 may then subtract all parts of the audio signal that are not human-audible sound and provide those parts to the reference signal module 222 for further processing to recover the reference signal 114.

The signal processing module 226 may then provide the remaining parts of the audio signal to the echo cancellation filter 228 for removal of any distortions (reverb, reflections, etc.) from the audio signal. Upon receiving a processed audio signal with distortions substantially removed, the signal processing module 226 may subtract the reference signal 114 recovered by the reference signal module 222 from the processed audio, and the remaining processed audio may substantially comprise the speech component correspond to the speech utterances 108. In some embodiments, the remaining processed audio may also include background noise, and the signal processing module 226 may invoke a background noise reduction functionality of the audio processing device 104/106 to substantially remove the background noise. Such background noise reduction functionality may utilize a model of human speech or of a particular speaker's voice to separate speech component correspond to the speech utterances 108 from background noise. The signal processing module 226 may then provide the remaining processed audio signal to the speech recognition module 230 for further processing.

In various embodiments, the echo cancellation filter 228 is trained with the acoustic attributes of the environment 102 and of microphones 206 and speakers 208 of the audio processing devices 104/106. Thus, when invoked and applied to the audio signal by the signal processing module 226, the echo cancellation filter 228 may remove acoustic distortions (reflections, reverb, etc.). The processed audio signal, with distortions subtracted, may substantially comprise the speech component corresponding to the speech utterances 108 and the audio component corresponding to the audio output 112 without distortions. The echo cancel-lation filter 228 may then return this processed audio signal to the signal processing module 226, as described above.

In some embodiments, rather than (or in addition to) utilizing the echo cancellation filter 228, the audio processing devices 104/106 may participate in a calibration stage. An audio processing device 104/106 acting as the second audio processing device 106 may output a calibration audio sound corresponding to a calibration reference signal at some time prior to outputting the reference signal 114 or audio output 112. An audio processing devices 104/106 acting as the first audio processing device 104 may then capture the calibration audio sound, may generate a calibration audio signal based at least in part on the captured calibration sound, and may receive the calibration reference signal in some manner, such as any of the manners described above for receiving the reference signal 114. The audio processing devices 104/106 may then compare the calibration audio signal to the calibration reference signal to determine one or more distortions present in the calibration audio signal. The signal processing module 226 may then later use these determined distortions to remove distortions from the audio signal that includes the speech component corresponding to the speech utterances 108 and the audio component corresponding to the audio output 112.

A speech recognition module 230 may provide basic speech recognition functionality. In some implementations, this functionality may be limited to specific commands that perform tasks like waking up the device, configuring the device, cancelling an input and the like. The amount of speech recognition capabilities implemented on the audio processing device 104/106 may vary between implementations, but the architecture described herein supports having some speech recognition local at the audio processing device 104/106 together with more expansive speech recognition at the remote server(s) 116, as described above. In such implementations, the speech recognition module 230 may attempt to recognize the speech component correspond to the speech utterances 108 included in the processed audio signal and, if unable to recognize the speech component correspond to the speech utterances 108, may provide the processed audio signal as a signal 126 to the remote server(s) 116. The remote server(s) 116 may then provide a representation of the speech 128 in response. After recognizing the speech component correspond to the speech utterances 108 and generating a representation of that speech component, or after receiving the representation of the speech 128, the speech recognition module 230 may provide the representation to the operating system 220 or an application of the audio processing device 104/106 for further processing.

Example Processes

Figure 3:
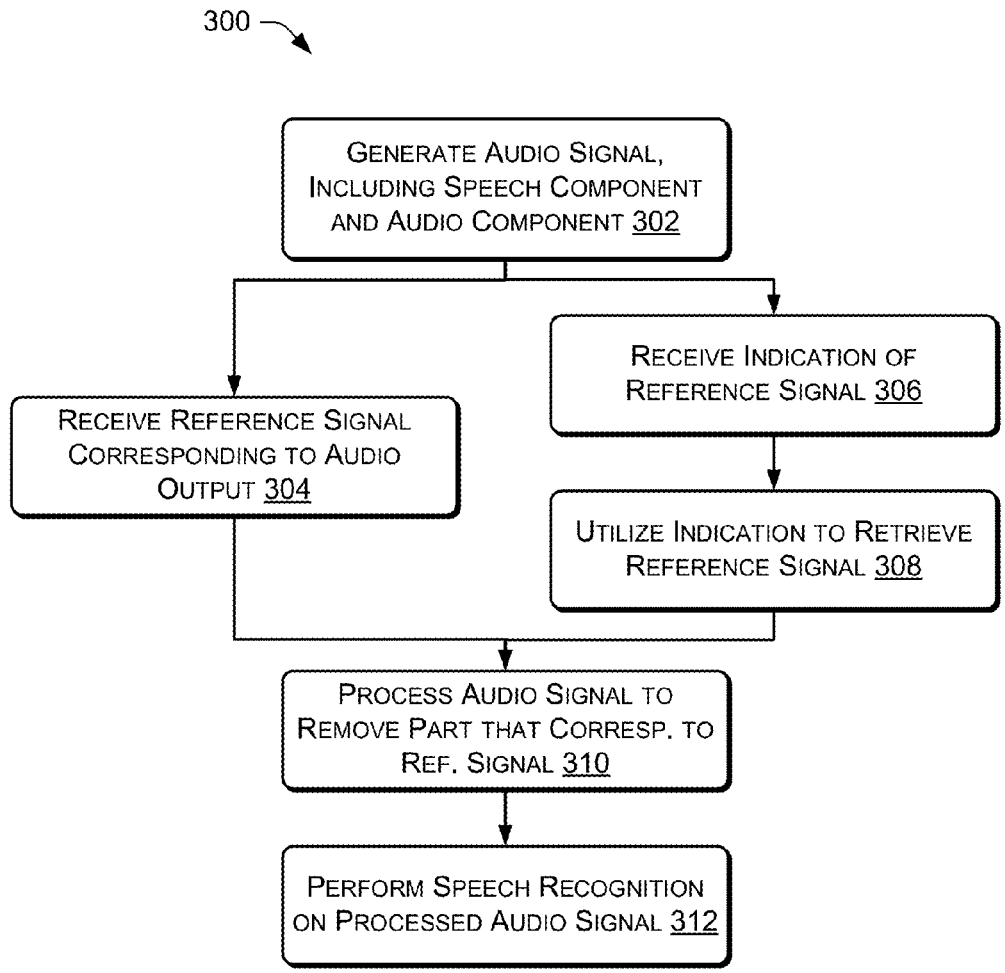
FIG. 3 illustrates an example flow diagram of a process for generating, based on captured sound, an audio signal including a speech component corresponding to a user's speech utterance and an audio component corresponding to audio output, receiving a reference signal that corresponds to the audio output, and processing the audio signal by removing a part that corresponds to the reference signal.
Figure 4:
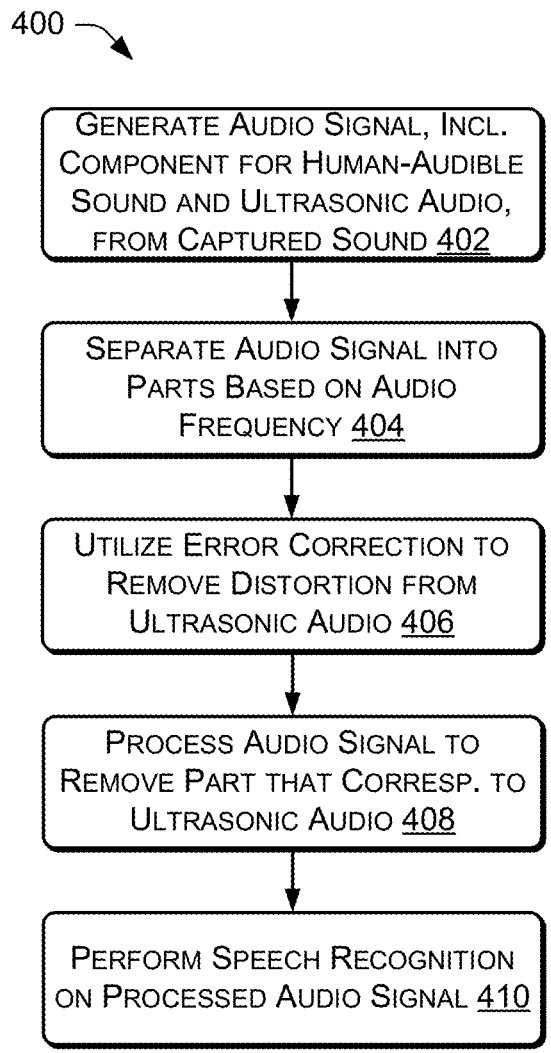
FIG. 4 illustrates an example flow diagram of a process for generating, based on captured sound, an audio signal including a speech component corresponding to a user's speech utterance, an audio component corresponding to human-audible audio output, and ultrasonic audio output, and processing the audio signal by removing at least a part of the an audio component based on the ultrasonic audio output.
Figure 5:
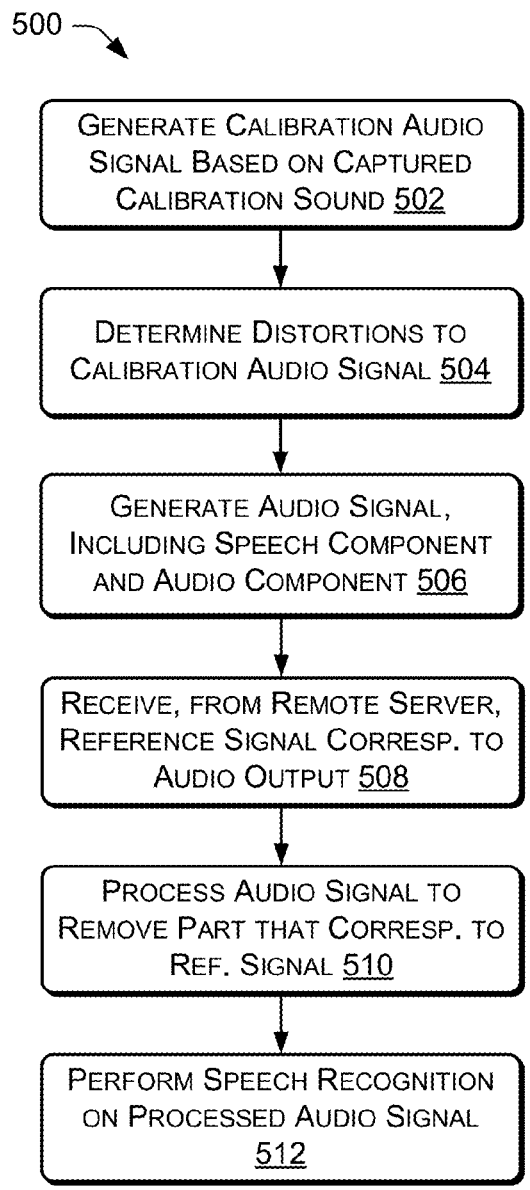
FIG. 5 illustrates an example flow diagram of a process for generating, based on captured sound, an audio signal including a speech component corresponding to a user's speech utterance and an audio component corresponding to audio output, receiving from a remote server a reference signal that corresponds to the audio output, and processing the audio signal by removing a part that correspond to the reference signal.

FIGS. 3-5 illustrate example processes 300, 400, and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 3 illustrates an example flow diagram of a process 300 for generating, from captured sound, an audio signal including a speech component corresponding to a user's speech utterance and an audio component corresponding to audio output, receiving a reference signal that corresponds to the audio output, and processing the audio signal by removing a part that correspond to the reference signal. The process 300 includes, at 302, generating, by a first device, an audio signal from sound captured via a microphone, the audio signal including a speech component corresponding to a user's speech utterance and an audio component associated with audio output from a second device.

At 304, the first device receives a reference signal that corresponds to the audio output from the second device. The reference signal may be received from the second device, through ultrasonic audio output of the second device or through a wireless data transmission from the second device. In other embodiments, the reference signal may be received from a remote server. Also, in some embodiments, the receiving at 304 is performed substantially concurrently with capturing the sound or is performed before capturing the sound.

At 306, rather than receiving the reference signal itself, the first device may receive an indication of a reference signal. The indication may be an identifier of the reference signal, a timestamp associated with a time at which the audio output of the second device was played, or other reference signal metadata. At 308, the first device may then utilize the indication to retrieve the reference signal from a remote server.

At 310, the first device may process the audio signal by removing at least a part of the audio signal that corresponds to the reference signal. In some embodiments, the first device may utilize the reference signal and an echo cancellation filter to remove the part of the audio signal.

At 312, the first device may perform speech recognition on the processed audio signal or may provide the processed audio signal to another entity (e.g., remote servers 116) for performing speech recognition.

FIG. 4 illustrates an example flow diagram of a process 400 for generating, from captured sound, an audio signal including a speech component corresponding to a user's speech utterance, an audio component corresponding to human-audible audio output, and ultrasonic audio output, and processing the audio signal by removing at least a part of the audio component corresponding to the human-audible audio output based on the ultrasonic audio output. The process 400 includes, at 402, generating an audio signal from sound captured via a microphone, the audio signal including audio component(s) corresponding to human-audible sound and ultrasonic audio output, the audio components corresponding to human-audible sound including a speech component corresponding to a user's speech utterance and an audio component corresponding to audio output of a second device. The ultrasonic audio output may be a digitally encoded reference signal that corresponds to the audio output of the second device. The digitally encoded reference signal may be encoded with error correction codes or with an error correction encoding scheme. In some embodiments, the audio output of the second device and ultrasonic audio output may be broadcast substantially concurrently by the second device.

At 404, the first device may separate a part of the audio signal corresponding to the human-audible sound from another part of the audio signal corresponding to the ultrasonic audio output, the separating being performed based on audio frequencies of the parts of the audio signal.

At 406, the first device may utilize the error correction codes or error correction encoding scheme to remove distortions to the reference signal from the part of the audio signal that corresponds to the ultrasonic audio output.

At 408, the first device may process the audio signal by removing at least a part of the audio component corresponding to the audio output of the second device from the audio signal based at least in part on the ultrasonic audio output.

At 410, the first device may perform speech recognition on the processed audio signal or may provide the processed audio signal to another entity (e.g., remote servers 116) for performing speech recognition.

FIG. 5 illustrates an example flow diagram of a process 500 for capturing an audio stream including a speech component corresponding to a user's speech utterance and an audio component corresponding to audio output, receiving from a remote server a reference signal that corresponds to the audio output, and processing the audio stream by removing a part that corresponds to the reference signal. The process 500 includes, at 502, generating, by a first device, a calibration audio signal from captured calibration sound output by a second device. At 504, the first device may then utilize the calibration audio signal and a reference signal corresponding to the audio output included in the calibration audio signal to determine one or more distortions applied to audio output by the second device or by an environment that includes the first device and the second device.

At 506, the first device may generate an audio signal from sound captured via a microphone, the audio signal including a speech component corresponding to a user's speech utterance and an audio component associated with audio output from a second device. This audio signal is captured after capturing the calibration sound.

At 508, the first device may receive, from a remote server, a reference signal that corresponds to the audio output included in the audio signal.

At 510, the first device may utilize the determined distortions and the reference signal corresponding to the audio output included in the audio signal to remove the part of the audio signal that corresponds to the reference signal. Alternatively, the first device may utilize the reference signal and an echo cancellation filter to remove the part of the audio signal that corresponds to the reference signal.

At 512, the first device may perform speech recognition on the processed audio signal or may provide the processed audio signal to another entity (e.g., remote servers 116) for performing speech recognition.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:
1. A first device comprising:
a processor;
a microphone to capture a speech utterance and an audio output from a second device and to generate an audio signal based at least in part on the speech utterance and the audio output from the second device, the audio signal including at least: (1) a speech component cor- responding to the speech utterance; and (2) an audio component associated with the audio output from the second device, the second device being physically independent from the first device and from a source of the speech utterance;

a reference signal module configured to be operated by the processor to receive a reference signal from the second device, the reference signal corresponding to the audio output from the second device;

a signal processing module configured to be operated by the processor to process the audio signal to generate a processed audio signal by removing at least a part of the audio signal that corresponds to the reference signal; and a speech recognition module configured to be operated by the processor to perform speech recognition on the processed audio signal or to provide the processed audio signal to another entity for performing the speech recognition, the processed audio signal substantially including the speech component.

2. The first device of claim 1, wherein the reference signal module receives the reference signal from the second device via an ultrasonic audio output of the second device.

3. The first device of claim 1, wherein the first device and second device are connected to a remote server over a network and receive audio signals from the remote server.

4. The first device of claim 3, wherein the reference signal module receives the reference signal from the remote server.

5. The first device of claim 3, wherein the reference signal module receives an indication of the reference signal from the second device and utilizes the indication to receive the reference signal from the remote server.

6. A computer-implemented method comprising:

receiving, at a first device via a microphone of the first device, a speech utterance and an audio output from a second device, the second device being physically separated from the first device and the second device being physically separated from a source of the speech utterance;

generating, by the first device, an audio signal including a speech component corresponding to the speech utterance and an audio component associated with the audio output from the second device;

receiving, by the first device, a reference signal from the second device, the reference signal corresponding to the audio output from the second device; and processing the audio signal to generate a processed audio signal by removing at least a part of the audio signal that corresponds to the reference signal.

7. The method of claim 6, further comprising performing speech recognition on the processed audio signal.

8. The method of claim 6, wherein the receiving comprises receiving the reference signal from the second device.

9. The method of claim 8, wherein the reference signal is received via ultrasonic audio output from the second device or through a wireless data transmission from the second device.

10. The method of claim 6, wherein the first device and second device are connected to a remote server over a network and receive audio signals from the remote server.

11. The method of claim 10, wherein the receiving comprises receiving the reference signal from the remote server.

12. The method of claim 10, wherein the receiving comprises receiving an indication of the reference signal and utilizing the indication to retrieve the reference signal from the remote server.

13. The method of claim 12, wherein the indication comprises at least one of an identifier of the reference signal, a timestamp associated with a time at which the audio output of the second device was played, or reference signal metadata.

14. The method of claim 6, wherein the receiving is performed substantially concurrently with capturing the audio component via the microphone or is performed prior to capturing the audio component via the microphone.

15. The method of claim 6, wherein the removing comprises utilizing an echo cancellation filter to remove distortions from the audio signal and then subtracting the reference signal from a resulting audio signal produced by the echo cancellation filter.

16. One or more non-transitory computer-readable media storing computer-executable instructions configured to program a first device to perform operations comprising:

generating an audio signal based at least in part on a speech utterance and an audio output from a second device, wherein:

the second device is physically separate from the first device and the second device is physically separate from a source of the speech utterance, the speech utterance and the audio output are captured via a microphone, the audio output includes a human-audible audio output and an ultrasonic audio output including a reference signal, and the audio signal includes a human-audible sound component and an ultrasonic audio component, the human-audible sound component including a speech component corresponding to the speech utterance and an audio component corresponding to the human-audible audio output, and the ultrasonic audio component including the reference signal;

processing the audio signal to generate a processed audio signal by removing at least a part of the audio component corresponding to the audio output by the second device from the audio signal based at least in part on the reference signal; and sending the processed audio signal to a remote system.

17. The one or more non-transitory computer-readable media of claim 16, wherein the ultrasonic audio output comprises a digitally encoded reference signal, the digitally encoded reference signal corresponding to the audio output of the second device.

18. The one or more non-transitory computer-readable media of claim 17, wherein the digitally encoded reference signal is encoded with error correction codes or with an error correction encoding scheme.

19. The one or more non-transitory computer-readable media of claim 18, wherein the operations further comprise utilizing the error correction codes or error correction encoding scheme to remove distortions to the digitally encoded reference signal from a part of the audio signal that corresponds to the ultrasonic audio output.

20. The one or more non-transitory computer-readable media of claim 16, wherein the audio output of the second device and the ultrasonic audio output are broadcast substantially concurrently by the second device.

21. The one or more non-transitory computer-readable media of claim 16, wherein the operations further comprise separating a first part of the audio signal corresponding to the human-audible sound from a second part of the audio signal corresponding to the ultrasonic audio output, the separating being performed based at least in part on audio frequencies of the first part and the second part of the audio signal.

22. One or more non-transitory computer-readable media storing computer-executable instructions configured to program a first device to perform operations comprising:
  generating an audio signal based at least in part on a speech utterance and an audio output from a second device, the speech utterance and the audio output from the second device being captured via a microphone of the first device, the audio signal including a speech component corresponding to the speech utterance and an audio component associated with the audio output from the second device, the second device being physically separate from the first device and the second device being physically separate from a source of the speech utterance;
  receiving, from a remote server via a wireless unit, a reference signal corresponding to the audio output from the second device; and
  processing the generated audio signal by removing at least a part of the audio signal that corresponds to the reference signal.

23. The one or more non-transitory computer-readable media of claim 22, wherein the operations further comprise, prior to generating the audio signal, generating another audio signal based at least in part on additional audio output that is played by the second device prior to playing the audio output of the second device.

24. The one or more non-transitory computer-readable media of claim 23, wherein the operations further comprise utilizing the other audio signal and a reference signal corresponding to the additional audio output to determine one or more distortions applied to audio output by the second device or by an environment that includes the first device and the second device.

25. The one or more non-transitory computer-readable media of claim 24, wherein the removing comprises utilizing the one or more distortions and the reference signal corresponding to the audio output to remove the part of the audio signal that corresponds to the reference signal.

26. The one or more non-transitory computer-readable media of claim 22, wherein the removing comprises utilizing an echo cancellation filter to remove distortions from the audio signal and then subtracting the reference signal from a resulting audio signal produced by the echo cancellation filter.

* * * * *